United States Patent
Prin et al.

(10) Patent No.: US 9,352,700 B2
(45) Date of Patent: May 31, 2016

(54) DEVICE FOR MOUNTING A UNIT, NOTABLY A RADIO, IN A MOTOR VEHICLE INSTRUMENT PANEL COMPARTMENT

(71) Applicant: RENAULT s.a.s., Boulogne-billancourt (FR)

(72) Inventors: Isabelle Prin, Orsay (FR); Alain Dagoreau, La Garenne Columbes (FR); Michel Bougault, Bougival (FR); Sylvie Perveyrie, Guyancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/385,321

(22) PCT Filed: Jan. 31, 2013

(86) PCT No.: PCT/EP2013/051916
§ 371 (c)(1),
(2) Date: Sep. 15, 2014

(87) PCT Pub. No.: WO2013/135420
PCT Pub. Date: Sep. 19, 2013

(65) Prior Publication Data
US 2015/0048217 A1    Feb. 19, 2015

(30) Foreign Application Priority Data

Mar. 14, 2012 (FR) .................... 12 52296

(51) Int. Cl.
*B60R 11/02* (2006.01)
*B60K 37/04* (2006.01)
*B60R 11/00* (2006.01)

(52) U.S. Cl.
CPC ............. *B60R 11/0205* (2013.01); *B60K 37/04* (2013.01); *B60K 2350/941* (2013.01); *B60R 2011/0047* (2013.01)

(58) Field of Classification Search
CPC ............... B60R 11/0205; B60R 2011/0047; B60K 37/04; B60K 2350/941
USPC ............. 248/27.1, 27.3, 198.1, 224.61; 312/223.2; 361/679.33–679.39
See application file for complete search history.

(56) References Cited

U.S. PATENT DOCUMENTS

| | | | | |
|---|---|---|---|---|
| 5,332,306 A | * | 7/1994 | Babb | ................... H05K 7/1418 312/223.1 |
| 5,560,572 A | | 10/1996 | Osborn et al. | |

(Continued)

FOREIGN PATENT DOCUMENTS

| | | |
|---|---|---|
| DE | 32 25 466 A1 | 1/1983 |
| JP | 58-144886 U | 9/1983 |

OTHER PUBLICATIONS

U.S. Appl. No. 14/385,304, filed Oct. 7, 2014, Perveyrie, et al.

(Continued)

*Primary Examiner* — Jonathan Liu
*Assistant Examiner* — Guang H Guan
(74) *Attorney, Agent, or Firm* — Oblon, McClelland, Maier & Neustadt, L.L.P

(57) ABSTRACT

A device is for mounting a unit including two parallel lateral faces on each of which there is disposed a stud. The device includes two parallel lateral slideways that are formed in a compartment in an instrument panel of a vehicle and form a groove that is oriented in a substantially longitudinal direction. The groove includes an entry zone and an end zone that is less high than the entry zone. The stud includes an elastically compressible part to vertically push the stud in an end zone of its groove during longitudinal introduction of the stud into its corresponding groove. The stud also includes a central part from which there extend two opposite symmetrical arms that each bear two turned-back lugs that are substantially parallel to the arms and form longitudinal anchors that are symmetrical with respect to the central part and are elastically compressible vertically.

6 Claims, 3 Drawing Sheets

(56) References Cited

U.S. PATENT DOCUMENTS

| | | | | |
|---|---|---|---|---|
| 6,293,636 B1* | 9/2001 | Le | ........................... | G06F 1/184 |
| | | | | 292/DIG. 37 |
| 6,313,985 B1* | 11/2001 | Chen | ....................... | G06F 1/184 |
| | | | | 312/334.7 |
| 6,318,679 B1* | 11/2001 | Yang et al. | ................... | 248/27.1 |
| 6,388,875 B1* | 5/2002 | Chen | ....................... | G06F 1/187 |
| | | | | 312/223.1 |
| 6,469,889 B1* | 10/2002 | Gan | ........................... | 361/679.33 |
| 6,798,653 B2* | 9/2004 | Chen et al. | ................ | 361/679.33 |
| 6,853,549 B2* | 2/2005 | Xu | ........................... | G06F 1/187 |
| | | | | 211/26 |
| 7,019,966 B2* | 3/2006 | Lee | ........................... | 361/679.36 |
| 7,092,250 B2* | 8/2006 | Chen | .................... | H05K 7/1487 |
| | | | | 361/679.35 |
| 7,198,338 B2* | 4/2007 | Liu et al. | .................... | 312/223.1 |
| 7,230,824 B2* | 6/2007 | Wei-Chieh et al. | ...... | 361/679.33 |
| 7,251,099 B2* | 7/2007 | Kao et al. | ................. | 361/679.33 |
| 7,295,432 B2* | 11/2007 | Xu | ........................ | G06F 1/184 |
| | | | | 361/679.33 |
| 7,515,407 B2* | 4/2009 | Goodman | .............. | G11B 33/08 |
| | | | | 248/634 |
| 7,623,345 B2* | 11/2009 | Shih | ..................... | H05K 7/1404 |
| | | | | 248/682 |
| 2004/0070930 A1* | 4/2004 | Scherer | ................ | G11B 33/128 |
| | | | | 361/679.39 |
| 2004/0145208 A1 | 7/2004 | Kapteyn | | |
| 2007/0030639 A1* | 2/2007 | Ko | ..................... | G11B 33/1493 |
| | | | | 361/679.34 |
| 2015/0034774 A1* | 2/2015 | Perveyrie | ............... | B60K 37/04 |
| | | | | 248/27.1 |
| 2015/0048217 A1* | 2/2015 | Prin | ..................... | B60K 37/04 |
| | | | | 248/27.1 |

OTHER PUBLICATIONS

International Search Report issued Mar. 4, 2013 in PCT/EP2013/051916.

\* cited by examiner

DEVICE FOR MOUNTING A UNIT, NOTABLY A RADIO, IN A MOTOR VEHICLE INSTRUMENT PANEL COMPARTMENT

BACKGROUND

The present invention relates to a device for mounting a unit, notably a radio, in a motor vehicle instrument panel compartment.

The mounting of a radio unit in the compartment provided to this end in the instrument panel of a vehicle must make it possible to correctly fix the set in all directions. The vertical dimension may for example be given by the combination of a peg positioned at the rear of the radio unit with lateral pegs for compensating for play; the central, rear peg passes into a corresponding orifice located at the end and in the middle of the compartment. However, the increase in the number of connectors at the rear of the unit, associated with the increase in functions on the radio, makes it desirable not to have to use the rear centering peg and to ensure the vertical dimension by other means.

The document U.S. Pat. No. 5,560,572 discloses a device for mounting a unit having two parallel lateral faces on each of which there is disposed a male member or stud, the device having two parallel lateral slideways that are formed in the compartment in the instrument panel of a vehicle and form a female member or groove that is oriented in an approximately longitudinal direction and has an entry zone and an end zone less high than the entry zone; the stud has an elastically compressible part that is intended to vertically push the stud in the groove during the introduction of the stud into the narrow (low) end zone of its corresponding groove. The construction of the groove in two separate parts and of the stud likewise in two parts is relatively complicated.

According to a solution observed in vehicles of the Mercedes® brand, there exists a mounting device with a single stud on each face of the unit, produced in the form of an oval male part having an elastically squeezable indentation formed by a recess parallel to the upper edge of the part, and a single convergent groove on each side of the compartment: when each of the elastic studs is inserted into its corresponding groove, the elastic part is deformed, is squeezed elastically, and ensures Z-wise pinning of the radio, thereby making it possible normally to absorb the geometric variations of the instrument panel.

However, the known devices lack precision and the compensation for play is not always achieved sufficiently.

BRIEF SUMMARY

The aim of the invention is to afford an alternative stud and mounting groove solution which allows greater precision and better compensation for play.

The invention achieves its aim by virtue of a device for mounting a unit having two parallel lateral faces on each of which there is disposed a stud, the device having two parallel lateral slideways that are formed in the compartment in the instrument panel of a vehicle and form a groove that is oriented in a substantially longitudinal direction and has an entry zone and an end zone that is less high than the entry zone, the stud having an elastically compressible part that is intended to vertically push the stud in the end zone of its groove during the longitudinal introduction of the stud into its corresponding groove, the stud comprising a central part from which there extend two opposite symmetrical arms that each bear two turned-back lugs that are substantially parallel to the arms and form longitudinal anchors that are symmetrical with respect to the central part and are elastically compressible vertically.

Thus, when the stud passes into the groove, in the less high end zone thereof, it is compressed vertically, this being possible by virtue of the anchor-forming lugs which pivot somewhat toward their support arm and reduce the height of the anchor. By virtue of the symmetrical design of the compressible parts of the stud, it has been found that the guidance of the stud in the groove is better than in the known solutions and that this device allows good compensation for play.

The device of the invention advantageously has one or more of the following features, on their own or in combination.

- the lugs of the anchor are separated from the arm of the anchor by an elongate longitudinal space which, at its end close to the origin of the lugs, is curved toward the arm, so as to favor the flexibility of the lugs;
- the central part of the stud consists of a transverse sleeve that is less wide than the arms and the lugs, so as to favor stable lateral bearing of the anchors against the lateral walls of the compartment or against a lateral wall of the groove associated with the stud;
- the stud has, on its inner side, pegs for fixing to the lateral faces of the unit, so as to be able to easily position it on the unit;
- each groove comprises essentially a first zone for longitudinal guidance, said first zone forming the entry zone having a height greater than the free height of the stud, and a second zone for vertical compression of the stud, said second zone forming the end zone having a height less than the free height of the stud.
- each groove has, in the vicinity of the end zone, a lateral fixing wall for the studs.

BRIEF DESCRIPTION OF THE DRAWINGS

Further features and advantages of the invention will become apparent from the following description of an exemplary embodiment. Reference will be made to the appended drawings, in which.

DETAILED DESCRIPTION

Figure 1:
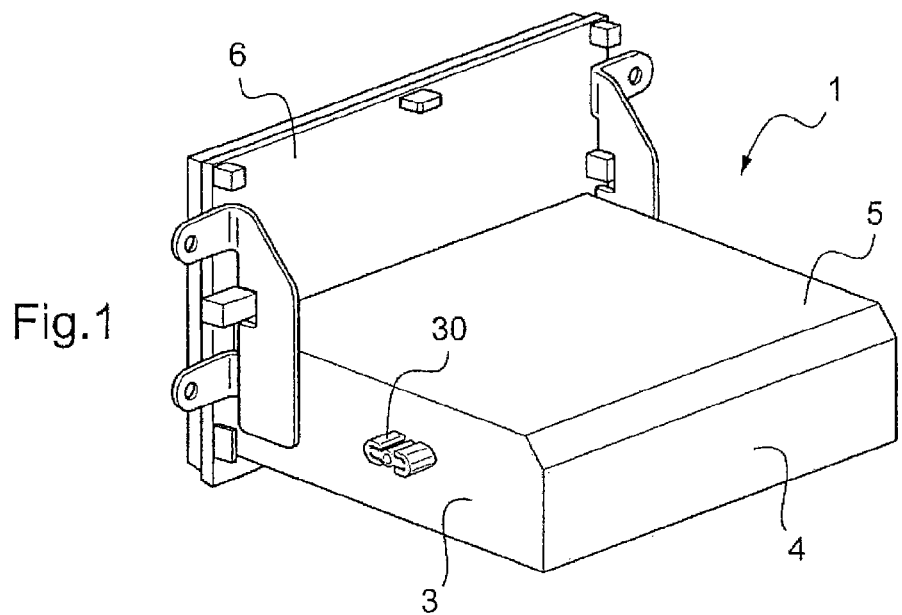
FIG. 1 is a schematic three-quarters rear perspective view of a radio set, the lateral faces of which are provided with elastic studs in accordance with the invention.
Figure 3:
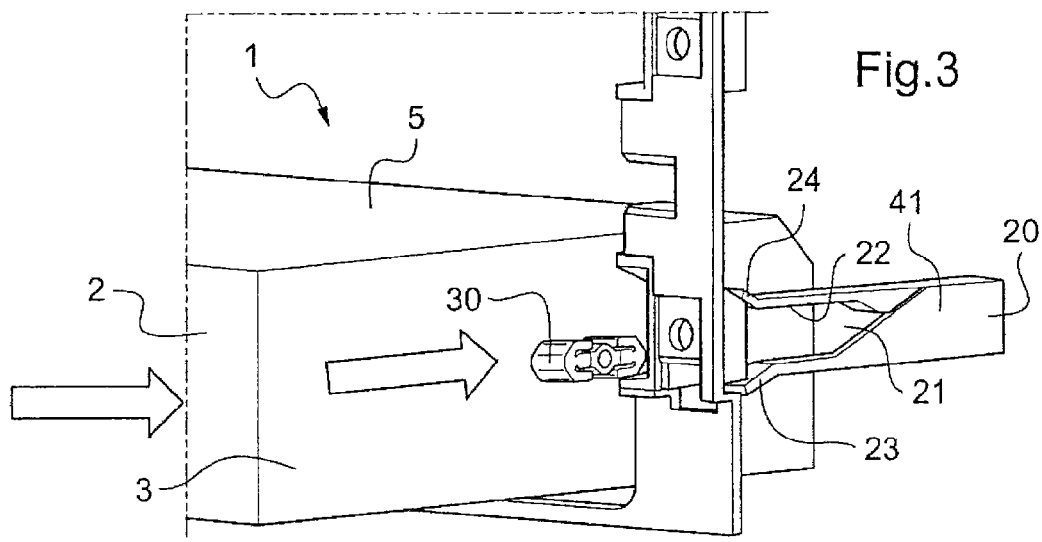
FIG. 3 is a partial three-quarters front perspective view of the radio unit and of one of the two lateral grooves of the compartment, during a first step in the insertion of the radio unit into the compartment.
Figure 4:
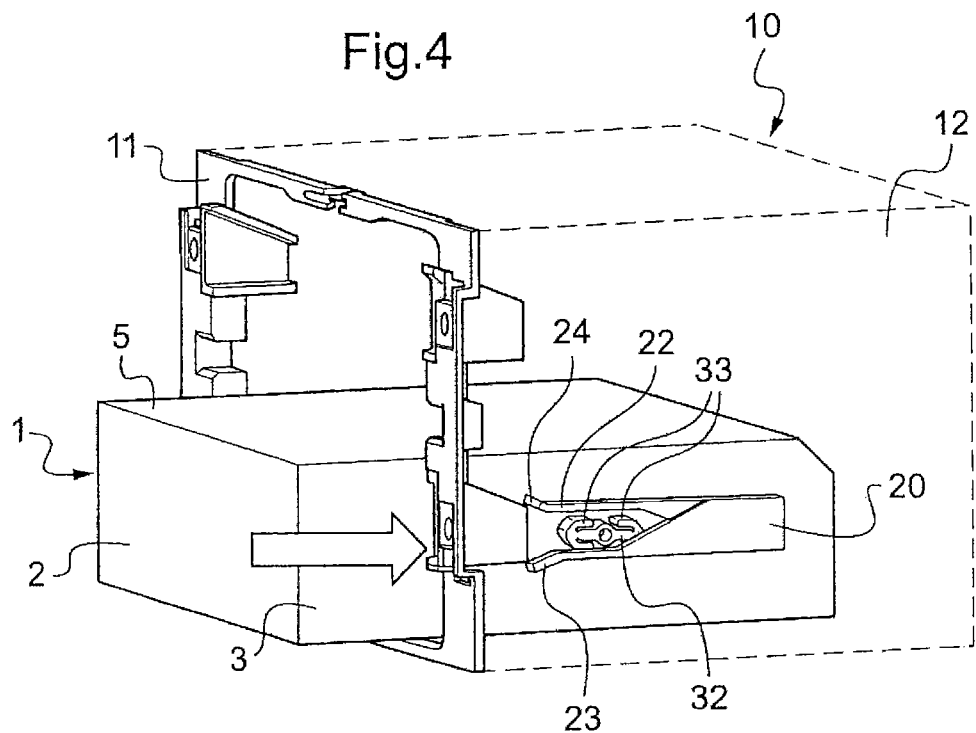
FIG. 4 is a partial three-quarters front perspective view of the radio unit and of one of the two lateral grooves of the compartment, during a second step in the insertion of the radio unit into the compartment.

As shown in FIGS. 1, 3 and 4, the radio unit 1 has a substantially parallelepipedal shape, with a vertical front wall 2, two vertical side walls 3, a vertical rear wall 4, a top 5 and a bottom. This unit 1 is intended to be housed in a compartment 10 that is only sketched in FIG. 4 and is formed in the instrument panel of a vehicle. A front facade 6 may be mounted on the front wall 2 of the unit 1. The compartment 10 generally has a standard size denoted 1 DIN for a single volume and 2 DIN for a double volume (as shown here, the unit 1 only taking up half thereof). The compartment 10 has a facade surround 11 to which equipment mounted in the compartment, and in particular the front facade 6 mounted on the unit 1, may be fixed. The compartment 10 has on its side walls 12, which are not shown in detail (and which may also not be solid walls), horizontal slideways or grooves 20, one on each side, that are intended to receive and retain elastic studs 30 disposed on the lateral faces 3 of the unit 1.

Figure 2:
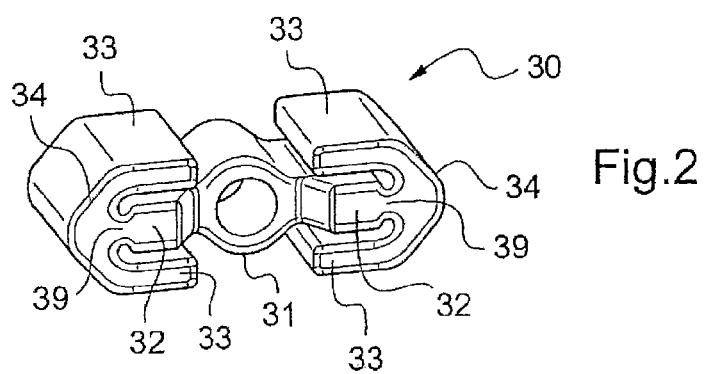
FIG. 2 is a perspective view of an elastic stud in accordance with the invention.
Figure 7:
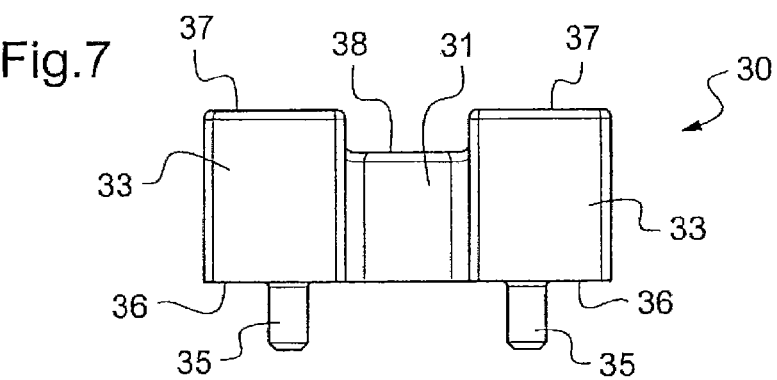
FIGS. 7 and 8 are respective top and side views of the stud from FIG. 2.
Figure 8:
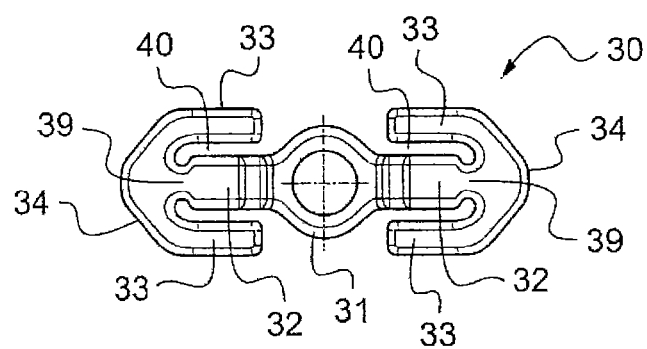

FIGS. 2, 7 and 8 show a detail of an elastic stud 30. It has a central sleeve 31 from which two anchors extend laterally, said anchors being formed by two diametrically opposite, longitudinal horizontal arms 32 which are each terminated by two turned-back lugs 33 that are substantially parallel to the arms 32. The starts of the lugs 33 form a rounded or ogival zone 34 at the front and rear ends of the stud 30. Two transverse horizontal fixing pegs 35 are disposed in an inner side 36 of the arms 32 so as to be able to be force-fitted into orifices formed in the lateral walls 3 of the unit 1, so as to fix the studs 30 horizontally on said walls 3. On the outer side 37 of the arms 32 and the lugs 33, opposite the pegs 35, the arms 32 and the lugs 33 project beyond the outer face 38 of the sleeve 31. In order to allow the lugs 33 to elastically bend properly toward the arm 32, a narrowing of material 39 is formed at the end of the arm 32, at the angle of departure of the lug 33 toward the center of the stud 30, such that the channel or space 40 formed between the lug 33 and the arm 32, from the end of the lug 33 to its origin, has essentially a horizontally elongate configuration of constant height, except at its end (at the origin of the lugs 33) where this space 40 is inclined somewhat toward the interior of the arm 32, as shown in FIG. 8.

The grooves or horizontal slideways 20 are formed from one or more parts and have essentially a generally horizontal guide slot 21 that is formed between an upper profile or rail 22 and a lower profile or rail 23. The guide slot 21 is open laterally on the inner side of the compartment 10 but is closed on the outer side, at least in the end region 41 of the groove 20. The height of the slot 21 decreases, for example incrementally, from its entry end to its furthest away end. The rails 22, 23 have in effect a first, rapidly convergent short section 24 followed by a first section 25 having a more or less constant or slightly convergent height, forming an entry zone for guiding the stud, said first section itself being followed by a new rapidly convergent short section 26 (only the upper rail 22 is involved here in the reduction in height of the slot 21, the lower rail 23 remaining horizontal once the entry section 24 has been passed), finally followed by a new section 27 having a substantially constant or slightly convergent height, forming the end zone for compressing the stud.

FIGS. 3 to 6 illustrate four steps in the introduction of the unit 1 into the housing 10 and in the engagement of the studs 30 in the horizontal grooves 20.

In FIG. 3, the unit 1 is partially introduced into the compartment 10 and the stud 30 is in the phase of approaching the corresponding groove 20.

In FIG. 4, with the unit 1 continuing its insertion, the generally horizontal stud 30 has started to be introduced into the generally horizontal groove 20, in the first section 25 of constant height, this height being greater than the free height of the stud 30.

Figure 5:
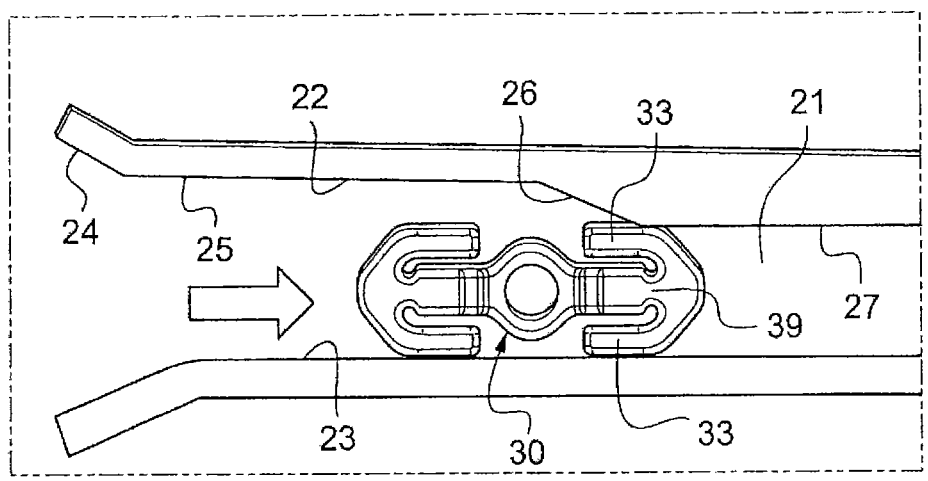
FIG. 5 is a partial side view of the elastic stud in the lateral groove during a third step in the insertion of the radio unit into the compartment.

In FIG. 5, the stud 30 has continued to slide on the lower rail 23 of the slot 21, and has been partially introduced into the highly convergent second section 26 in order to reach the second section 27 of constant height, said second section 27 having a height slightly less than the free height of the stud 30. Consequently, during the passage through the highly convergent section 26, the rails 21, 22 which narrow press against the lugs 33 of the right-hand anchor of the stud 30 and the height of the anchor decreases by virtue of the elasticity of the lugs 33. In one particular example, the height of the anchor may decrease by 0.5 mm on each side, or 1 mm overall.

Figure 6:
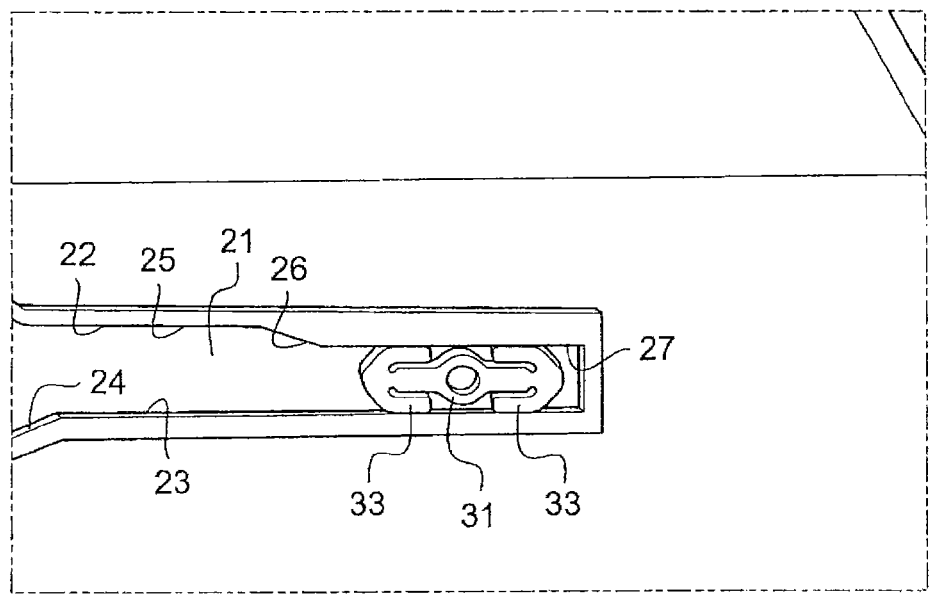
FIG. 6 is a partial side view of the elastic stud in the lateral groove during a fourth step in the insertion of the radio unit into the compartment.

When the movement is continued, FIG. 6, the left-hand anchor passes in turn through the highly convergent section and has its height compressed slightly in order to correspond to the height of the section 27. Consequently, in this section 27, which is the end section of the groove 20, the latter is perfectly maintained vertically by virtue of the stable pinning effected by the lugs 33 of the two anchors formed on the stud 30.

By virtue of its substantially horizontal overall shape with its ends in two elastically compressible symmetrical parts (the anchors formed by the lugs 33), the guidance of the stud 30 in its groove 20 is excellent and stable: since the free ends or lugs 33 are separated from the body of the stud 30 by gorges or channels 40 having a curved shape at their ends, it was found that the bending or pivoting of the ends was better than with entirely straight gorges or channels. The compensation for play is more effective. More significant play can be compensated for than in the known solutions.

In order to ensure its strength and its elasticity, the stud 30 is made of a material such as a plastics material, in particular a POM (polyoxymethylene).

The invention claimed is:

1. A system for mounting a unit including two parallel lateral faces, the system comprising:
   a stud configured to be disposed on each of the two parallel lateral faces;
   two lateral slideways configured to be formed in a compartment of an instrument panel of a vehicle, each of the two lateral slideways forming a groove oriented in a substantially longitudinal direction and including an entry zone and an end zone that is less high than the entry zone,
   wherein the stud includes a central part, two opposite symmetrical arms extending from the central part and each including a narrowing of material at an end furthest away from the central part, a first pair of turned-back lugs substantially parallel to a first one of the two opposite symmetrical arms, a second pair of turned-back lugs substantially parallel to a second one of the two opposite symmetrical arms, a first rounded zone directly extending from the narrowing of material of the first one of the two opposite symmetrical arms and directly connected to the first pair of turned-back lugs, and a second rounded zone directly extending from the narrowing of material of the second one of the two opposite symmetrical arms and directly connected to the second pair of turned-back lugs, and
   wherein the first pair of turned back lugs, the first rounded zone, and the first one of the two opposite symmetrical arms form a first elastically compressible part, wherein the second pair of turned-back lugs, the second rounded zone, and the second one of the two opposite symmetrical arms form a second elastically compressible part, and wherein the first elastically compressible part and the second elastically compressible part are symmetrical with respect to the central part and are configured to be elastically compressible vertically in the end zone of the groove of each of the two lateral slideways during a longitudinal introduction of the stud into the groove of each of the two laterally slideways.

2. The system as claimed in claim 1, wherein the first pair of turned back lugs is separated from the first one of the two opposite symmetrical arms by an elongated longitudinal space, and an end of the elongated longitudinal space close to the first rounded zone is curved toward the first one of the two opposite symmetrical arms.

3. The system as claimed in claim 1, wherein the central part of the stud includes a transverse sleeve with a width smaller than a maximum width of each of the first elastically compressible part and the second elastically compressible part.

4. The system as claimed in claim 1, wherein the stud includes pegs on an inner side of the stud for fixing to each of the two parallel lateral faces of the unit.

5. The system as claimed in claim 1, wherein the entry zone of the groove of each of the two lateral slideways is formed in a first zone with a height greater than a free height of the stud for longitudinal guidance, and the end zone of the groove of each of the two lateral slideways is formed in a second zone with a height less than the free height of the stud for vertical compression of the first and second elastically compressible parts.

6. The system as claimed in claim 1, wherein the groove of each of the two lateral slideways includes a lateral fixing wall in a vicinity of the end zone for fixing the stud.

\* \* \* \* \*